United States Patent
Zhang (10) Patent No.: US 10,985,461 B2
(45) Date of Patent: Apr. 20, 2021

(54) TERMINAL DEVICE

(71) Applicant: XI'AN YEP TELECOMMUNICATION TECHNOLOGY, LTD., Shaanxi (CN)

(72) Inventor: Ruofeng Zhang, Shaanxi (CN)

(73) Assignee: XI'AN YEP TELECOMMUNICATION TECHNOLOGY, LTD., Shaanxi (CN)

( * ) Notice: Subject to any disclaimer, the term of this patent is extended or adjusted under 35 U.S.C. 154(b) by 0 days.

(21) Appl. No.: 16/968,672

(22) PCT Filed: Dec. 12, 2018

(86) PCT No.: PCT/CN2018/120743
§ 371 (c)(1),
(2) Date: Aug. 10, 2020

(87) PCT Pub. No.: WO2019/137145
PCT Pub. Date: Jul. 18, 2019

(65) Prior Publication Data
US 2021/0013609 A1    Jan. 14, 2021

(30) Foreign Application Priority Data
Jan. 10, 2018 (CN) .......................... 201810023903.X (51) Int. Cl.
*H01Q 5/371* (2015.01)
*H04B 1/00* (2006.01)
*H04B 1/04* (2006.01)

(52) U.S. Cl.
CPC .............. *H01Q 5/371* (2015.01); *H04B 1/006* (2013.01); *H04B 1/0057* (2013.01); *H04B 1/04* (2013.01); *H04B 2001/0408* (2013.01)

(58) Field of Classification Search
CPC ...... H04B 1/005; H04B 1/0053; H04B 1/006; H04B 1/0064; H04B 1/0067; H04B 1/04;
(Continued)

(56) References Cited

U.S. PATENT DOCUMENTS 9,621,327 B2 * 4/2017 Chang ...................... H04B 1/40
10,567,012 B2 * 2/2020 Zhang .................. H04B 1/0057
(Continued)

FOREIGN PATENT DOCUMENTS

CN         106130570 A      11/2016
CN         106230569 A      12/2016
(Continued)

OTHER PUBLICATIONS

International Search Report for PCT/CN2018/120743 dated Mar. 1, 2019.

*Primary Examiner* — Quochien B Vuong
(74) *Attorney, Agent, or Firm* — The PL Law Group, PLLC (57) ABSTRACT

A terminal device includes a first antenna, a second antenna, a first channel electrically connected to the first antenna, and a second channel electrically connected to the second antenna. The first channel includes at least two first transmitting branches used to transmit carrier signals for carrier aggregation (CA). The second channel includes a receiving branch electrically connected to the second antenna and a receiving filter electrically connected to the receiving branch. The receiving branch may be used to receive CA signals through the second antenna, and the receiving filter may be used to filter the CA signals to obtain the carrier signals for CA.

15 Claims, 3 Drawing Sheets

(58) Field of Classification Search
CPC .......... H04B 1/0452; H04B 1/16; H04B 1/44; H04B 1/48; H04B 1/50; H04B 1/401; H04B 7/0602; H04W 72/0453; H04W 88/02; H04W 88/06; H04M 11/062; H04L 5/14

See application file for complete search history.

(56) References Cited

U.S. PATENT DOCUMENTS

| | | | |
|---|---|---|---|
| 10,666,300 B2* | 5/2020 | Wloczysiak | H04L 5/0098 |
| 10,749,512 B2* | 8/2020 | Balteanu | H04B 1/44 |
| 2014/0376417 A1 | 12/2014 | Khlat | |

FOREIGN PATENT DOCUMENTS

| | | | |
|---|---|---|---|
| CN | 106487415 A | * | 3/2017 |
| CN | 106487415 A | | 3/2017 |
| CN | 106685437 A | | 5/2017 |
| CN | 106788576 A | | 5/2017 |
| CN | 108365860 A | | 8/2018 |

* cited by examiner

TERMINAL DEVICE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/CN2018/120743, filed Dec. 12, 2018, which claims priority to the benefit of Chinese Patent Application No. 201810023903.X filed in the Chinese Intellectual Property Office on Jan. 10, 2018, the entire contents of which are incorporated herein by reference.

TECHNICAL FIELD

The present application relates to the field of communication, in particular to a terminal device.

BACKGROUND

Carrier aggregation (CA) is the key technology of LTE-A. To meet the requirements for increasing single-user peak rate and system capacity, the most direct approach is to increase the system transmission bandwidth. In view of this, the LTE-Advanced system introduces a technique for increasing the transmission bandwidth, that is, CA. In CA, 2-5 LTE component carriers can be aggregated to obtain a transmission bandwidth up to 100 MHz, thus effectively increasing the uplink and downlink transmission rate. The maximum number of carriers that can be simultaneously used by a terminal device for uplink and downlink transmission depends on the capacity of the terminal device.

At present, quadplexers or hexiplexers are generally used to implement CA. The quadplexers have four one-way ports and one two-way port, wherein the four one-way ports are respectively connected to two transmitting paths and two receiving paths, and the two-way port is used to aggregate carriers in two frequency bands and separate received CA signals to support the simultaneous operation of the carriers in the two frequency bands so that CA of 2CC can be realized. Similarly, the hexiplexers have six one-way ports and one two-way port, wherein the six one-way ports are respectively connected to three transmitting paths and three receiving paths to support the simultaneous operation of carriers in three frequency bands so that CA of 3CC can be realized.

However, when traditional quadplexers or hexiplexers are used to implement CA, a large insertion loss of a radio frequency front end is often caused, thus reducing the conduction performance of radio frequency reception; and the CA cost is high.

In view of this, there is an urgent need at present for a terminal device, which can improve communication quality, reduce the cost, and improve product competitiveness.

SUMMARY

The embodiments of the present application provide a terminal device to solve the technical problem that a radio frequency front end for CA in the prior art is difficult to design and has high cost.

An embodiment of the present application provides a terminal device, which comprises:

A first antenna, a second antenna, a first channel electrically connected to the first antenna, and a second channel electrically connected to the second antenna, wherein:

The first channel comprises at least two first transmitting branches, wherein the at least two first transmitting branches are used to transmit carrier signals for CA through the first antenna;

The second channel comprises a receiving branch electrically connected to the second antenna and a receiving filter electrically connected to the receiving branch, wherein the receiving branch is used to receive CA signals through the second antenna, and the receiving filter is used to filter the CA signals to obtain the carrier signals for CA.

In a possible implementation, the first channel comprises a switch circuit, wherein one terminal of the switch circuit is electrically connected to the first antenna, and the other terminal of the switch circuit is electrically connected to the first transmitting branches;

The at least two first transmitting branches comprise transmitting filters, wherein one terminal of each transmitting filter is electrically connected to the other terminal of the switch circuit, and the other terminal of each transmitting filter is electrically connected to a radio frequency chip.

In a possible implementation, the first channel comprises a switch circuit, wherein one terminal of the switch circuit is electrically connected to the first antenna, and the other terminal of the switch circuit is electrically connected to the first transmitting branches;

At least one first transmitting branch comprises a duplexer, wherein one terminal of the duplexer is electrically connected to the other terminal of the switch circuit, and the other terminal of the duplexer is electrically connected to a radio frequency chip.

In a possible implementation, the terminal device further comprises a balun.

A first input terminal of the balun is electrically connected to the duplexer in the at least one first transmitting branch, a second input terminal of the balun is electrically connected to the receiving filter in the second channel, and an output terminal of the balun is electrically connected to the radio frequency chip;

The balun is used to combine the same carrier signals for CA received by the at least one first transmitting branch and the second channel into an enhanced carrier signal.

In a possible implementation, the first channel further comprises a second transmitting branch, wherein the second transmitting branch is electrically connected to the other terminal of the switch circuit and is used to transmit a single-carrier signal.

In a possible implementation, the receiving branch is also used to receive the single-carrier signal, and the frequency band of the single-carrier signal overlaps with the frequency band of at least one of the carrier signals for CA.

In a possible implementation, the first transmitting branches are also used to transmit a single-carrier signal, wherein the frequency band of the single-carrier signal overlaps with the frequency band of at least one of the carrier signals for CA.

In a possible implementation, the second transmitting branch comprises a duplexer;

One terminal of the duplexer is electrically connected to the other terminal of the switch circuit, the other terminal of the duplexer is electrically connected to the radio frequency chip, and the second transmitting branch is also used to receive the single-carrier signal.

In a possible implementation, the terminal device further comprises:

A controller used to control the switch-on state of the other terminal of the switch circuit with the first transmitting branches and the second transmitting branch.

In a possible implementation, the transmitting filters and/or duplexers in the first transmitting branches are electrically connected to the radio frequency chip through power amplifiers;

The duplexer in the second transmitting branch is electrically connected to the radio frequency chip through the power amplifier.

An embodiment of the present application provides a carrier aggregation method, which comprises determining at least two frequency bands for CA.

In the case of downlink CA, controlling the switch circuit to switch on a first transmitting branch corresponding to one of the at least two frequency bands; or In the case of uplink CA, controlling the switch circuit to switch on first transmitting branches corresponding to the at least two frequency bands.

In a possible implementation, determining the at least two frequency bands for CA comprises: determining the at least two frequency bands according to received indication information from a network-side device, wherein the indication information is used to indicate the at least two frequency bands.

The terminal device provided by the embodiment of the present application comprises a first antenna, a second antenna, a first channel electrically connected to the first antenna, and a second channel electrically connected to the second antenna, wherein the first channel comprises at least two first transmitting branches used to transmit carrier signals for CA; and the second channel comprises a receiving branch electrically connected to the second antenna and a receiving filter electrically connected to the receiving branch, the receiving branch is used to receive CA signals, and the receiving filter is used to filter the CA signals to obtain the carrier signals for CA. According to embodiments of the present application, CA can be implemented without quadplexers, and the CA cost is greatly reduced; and the second antenna does not adopt a switch so that an insertion loss caused by the usage of a switch for receiving carrier signals for CA in the prior art is avoided, and the radio frequency receiving performance is effectively improved. The communication quality is improved, the cost is reduced, and the product competitiveness is improved.

DETAILED DESCRIPTION

To make the purposes, technical solutions and advantages of the embodiments of the present invention clearer, the technical solutions of the embodiments of the present application are described below in combination with the accompanying drawings of the embodiments.

The structural schematic diagrams of a terminal device provided by the embodiments of the present application are provided. The terminal device may be a mobile phone (also referred to as a cell phone) or a computer with a mobile terminal, such as a portable computer, a pocket computer, a handheld computer, or a mobile device installed in a computer or on a vehicle, which exchanges speeches and/or data with a wireless access network. For example, the terminal device can be a personal communication service (abbreviated as PCS) phone, a cordless phone, a session initiation protocol (abbreviated as SIP) phone, a wireless local loop (abbreviated as WLL) station, a personal digital assistant (abbreviated as PDA), or the like. A wireless terminal device may also be called a system, a subscriber unit, a subscriber station, a mobile station, a mobile, a remote station, a remote terminal, an access terminal, a user terminal, a user agent, or a user device or user equipment.

Figure 1:
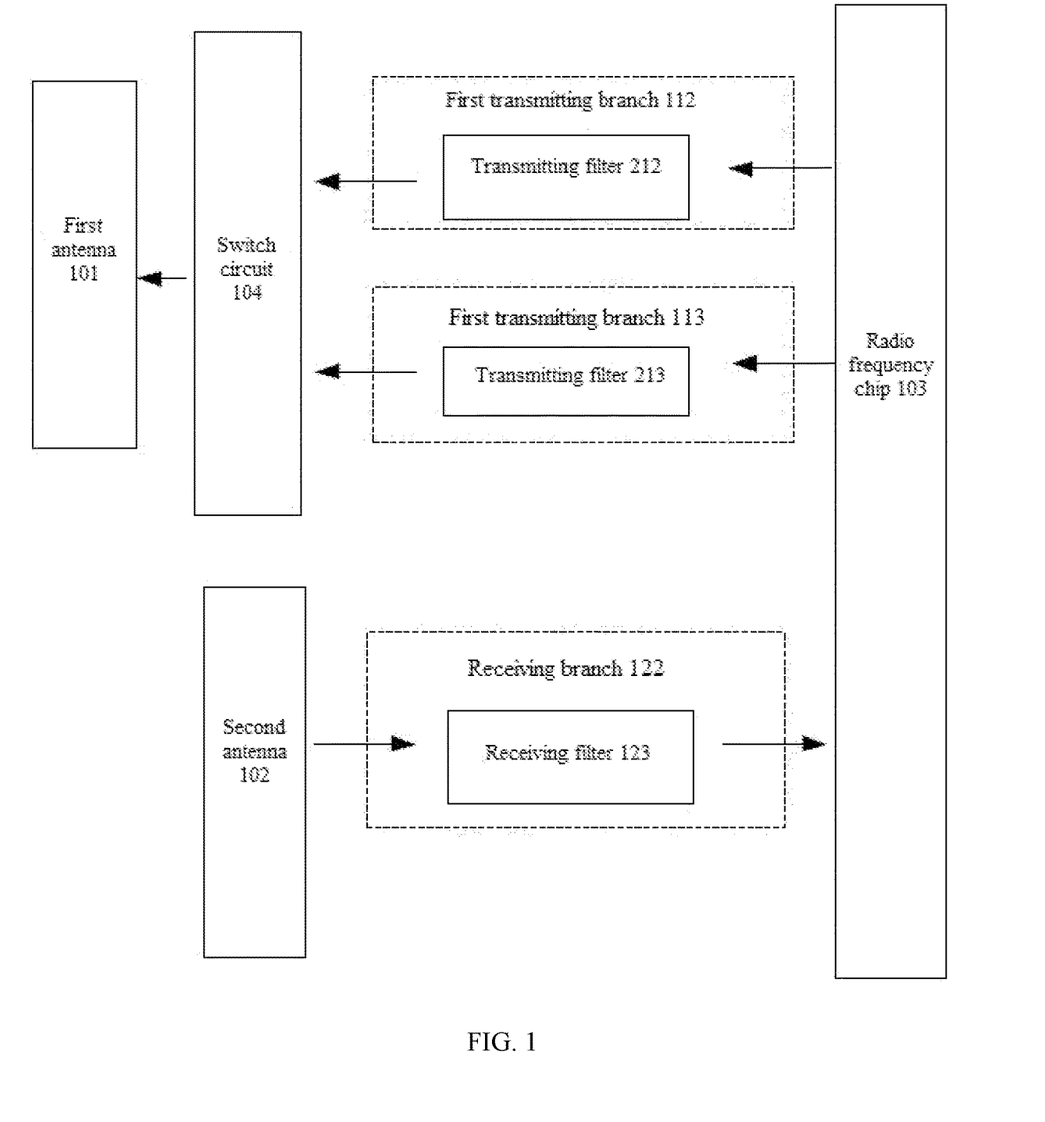
FIG. 1 is a structural schematic diagram of a terminal device provided by one embodiment of the present application.

Refer to FIG. 1 which is a structural diagram of a terminal device provided by one embodiment of the present application. It should be noted that in the embodiment illustrated by FIG. 1, two first transmitting branches are configured as an example. Other embodiments involving multiple first transmitting branches are similar to this embodiment and will no longer be detailed herein.

The terminal device comprises a first antenna 101, a second antenna 102, a first channel electrically connected to the first antenna 101, and a second channel electrically connected to the second antenna 102;

The first channel comprises at least two first transmitting branches 112-113, wherein the first transmitting branches 112-113 are used to transmit carrier signals for CA through the first antenna 101;

The second channel comprises a receiving branch 122 electrically connected to the second antenna 102 and a receiving filter 123 electrically connected to the receiving branch 122, wherein the receiving branch 122 is used to receive CA signals through the second antenna 102, and the receiving filter 123 is used to filter the CA signals to obtain the carrier signals for CA.

The receiving filter 123 is a band-pass filter. The frequency band of carriers allowed to pass through the receiving filter 123 is consistent with the frequency band of carriers received by the receiving branch 122.

In a specific implementation process, the first channel comprises a switch circuit 104, wherein one terminal of the switch circuit 104 is electrically connected to the first antenna 101, and the other terminal of the switch circuit 104 is electrically connected to the first transmitting branches 112-113;

The switch circuit 104 may have multiple input ports and one output port. The multiple input ports are to switch on transmitting branches of the same frequency band, among the first transmitting branches 112-113. The number of the input ports may be determined as actually needed. For example, if CA in two frequency bands is actually needed, the switch circuit 104 just needs to switch on the transmitting branch corresponding to one of the two frequency bands to implement downlink CA in the two frequency bands, and in this case, the switch circuit 104 requires only two input ports. In actual application, in order to adapt to the increase of the number of carriers to be aggregated in the subsequent stage, the switch circuit 104 can be designed with multiple candidate input ports. The output port is electrically connected to the first antenna 101 or a back-end circuit of the first antenna 101.

In a possible implementation, the terminal device further comprises a controller used to control the switch-on state of the other terminal of the switch circuit with the first transmitting branches 112-113.

The first antenna 101 and the second antenna 102 may each comprise an antenna body and an antenna back-end circuit. Or, the first antenna 101 and the second antenna 102 may each comprise an antenna body only. The first antenna 101 and the second antenna 102 can radiate carrier modulation signals to air and receive electromagnetic waves in the air.

Optionally, as shown in FIG. 1, the terminal device in this embodiment may further comprise a radio frequency integrated circuit (abbreviated as RFIC). Of course, in an actual application, the RFIC may be an independent element. The RFIC is used to modulate uplink data onto carriers to form the carrier modulated signals and demodulate received carrier modulated signals to obtain downlink data.

The first transmitting branches 112-113 comprise transmitting filters 212-213, wherein one terminal of each of the transmitting filters 212-213 is electrically connected to the other terminal of the switch circuit 104, and the other terminal of each of the transmitting filters 212-213 is electrically connected to a radio frequency chip 103. The transmitting filters are band-pass filers. The frequency band of carriers allowed to pass through the transmitting filters is consistent with the frequency band of carriers transmitted by the transmitting branches. The first transmitting branch 112 comprises a transmitting filter 212 which allows carriers in a first frequency band to pass through so that the first transmitting branch 112 is used to transmit a carrier modulated signal in the first frequency band. The first transmitting branch 113 comprises a transmitting filter 213 which allows carriers in a second frequency band to pass through so that the first transmitting branch 113 is used to transmit a carrier modulated signal in the second frequency band. The carrier signals in the first frequency band and the second frequency band are carrier signals for CA. The first frequency band is different from the second frequency band.

Figure 2:
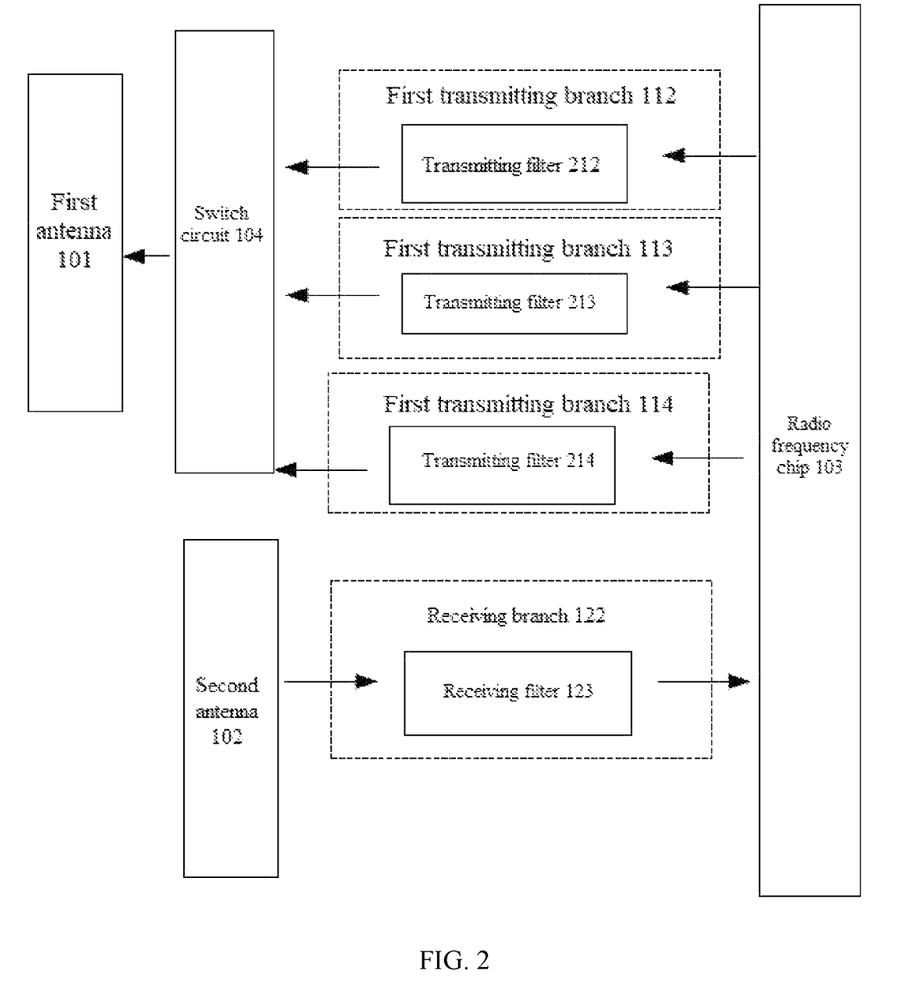
FIG. 2 is a structural schematic diagram of a terminal device provided by another embodiment of the present application.

As shown in FIG. 2, in one embodiment of the present application, the first transmitting branches 112-114 comprise transmitting filters 212-214, wherein one terminal of each of the transmitting filters 212-214 is electrically connected to the other terminal of the switch circuit 104, and the other terminal of each of the transmitting filters 212-214 is electrically connected to a radio frequency chip 103. The transmitting filters are band-pass filters. The frequency band of carriers allowed to pass through the transmitting filters is consistent with the frequency band of carriers transmitted by the transmitting branches.

In a possible implementation, the first transmitting branch 114 comprises a two-in-one transmitting filter 214 corresponding to the first frequency band and the second frequency band and allows carriers in the first frequency band and the second frequency band to pass through.

In another possible implementation, the first transmitting branch 114 comprises two independent transmitting filters which are electrically connected to the other terminal of the switch circuit 104 through a duplexer to implement uplink CA. The duplexer is used to combine carriers in the first frequency band and the second frequency band into carriers in one frequency band.

It should be noted that the first transmitting branch 114 can be added or deleted as actually needed. Specifically, if a user needs to carry out downlink CA, the first transmitting branch 114 can be deleted; or, if the user needs to carry out uplink CA, the first transmitting branch 114 can be added. The present application has no limitations in this aspect.

To sum up, when the transmitting filters are all independent filters, the number of the first transmitting branches is equal to the number of frequency bands for CA. When the transmitting filters include an all-in-one filter and/or a two-in-one filter, the number of the first transmitting branches is greater than the number of the frequency bands for CA. If the transmitting filters are filters that can combine all frequency bands for CA into one, only one transmitting filter may be configured.

Notably, the fact that the two frequency bands are different from each other means that the frequency ranges of the two frequency bands do not overlap, while the frequency bandwidths of the two frequency bands may be identical or different. For example, the frequency range of the first frequency band is 780 MHz-800 MHz, and the frequency bandwidth of the first frequency band is 20 MHz; and the frequency range of the second frequency band is 960 MHz-980 MHz, and the frequency bandwidth of the second frequency band is 20 MHz.

The second channel comprises a receiving branch 122 electrically connected to the second antenna and a receiving filter 123 electrically connected to the receiving branch 122, wherein the receiving branch 122 is used to receive CA signals, and the receiving filter 123 is used to filter the CA signals to obtain respective carrier signals for CA. For example, the receiving branch 122 receives CA signals in the first frequency band and the second frequency band, and the receiving filter 123 may be a two-in-one receiving filter used to transmit the carrier signals in the first frequency band and the second frequency band of the CA signals, respectively, to the radio frequency chip.

To improve the receiving performance, the carrier signals for CA are synchronously received by the first antenna and the second antenna to obtain an enhanced carrier signal. Particularly, the carrier signals for CA in the first frequency band or the second frequency band can be received by the receiving branch and the first transmitting branch.

In a specific implementation process, at least one first transmitting branch comprises a duplexer, wherein one terminal of the duplexer is electrically connected to the other terminal of the switch circuit, and the other terminal of the duplexer is electrically connected to the radio frequency chip; and at least one first transmitting branch is also used to receive the carrier signals for CA.

In a possible implementation, the terminal device further comprises a balun;

A first input terminal of the balun is electrically connected to the duplexer in the at least one first transmitting branch, a second input terminal of the balun is electrically connected to the receiving filter in the second channel, and an output terminal of the balun is electrically connected to the radio frequency chip 103;

The balun is used to combine the same carrier signals for CA received by the at least one first transmitting branch and the second channel into an enhanced carrier signal.

Of course, duplexers may be configured in multiple first transmitting branches to obtain multiple enhanced carrier signals for CA. The specific process of obtaining the multiple enhanced carrier signals is similar to the process of obtaining one enhanced carrier signal and will no longer be detailed herein.

As can be known from the above description, in this embodiment of the present application, the transmitting filters are used to transmit carrier signals for CA, and the second antenna is additionally configured and comprises the receiving filter used to receive CA signals to realize uplink CA or downlink CA; and since usage of high-cost elements such as quadplexers is avoided, the structure is simple, and the difficulty in design is reduced. In addition, no switch circuit is configured in the second channel, so that the insertion loss is reduced, and the communication performance is improved.

The terminal device in the embodiment of the present application can transmit and receive the single-carrier signal in the following way:

The first transmitting branches are also used to receive the single-carrier signal, wherein the frequency band of the single-carrier signal overlaps with the frequency band of at least one carrier signal for CA.

For example, if it is determined that the transmitting frequency band of the single-carrier signal is identical with the transmitting frequency band of the first frequency band for CA, the single-carrier signal is transmitted by the first transmitting branch 112.

Figure 3:
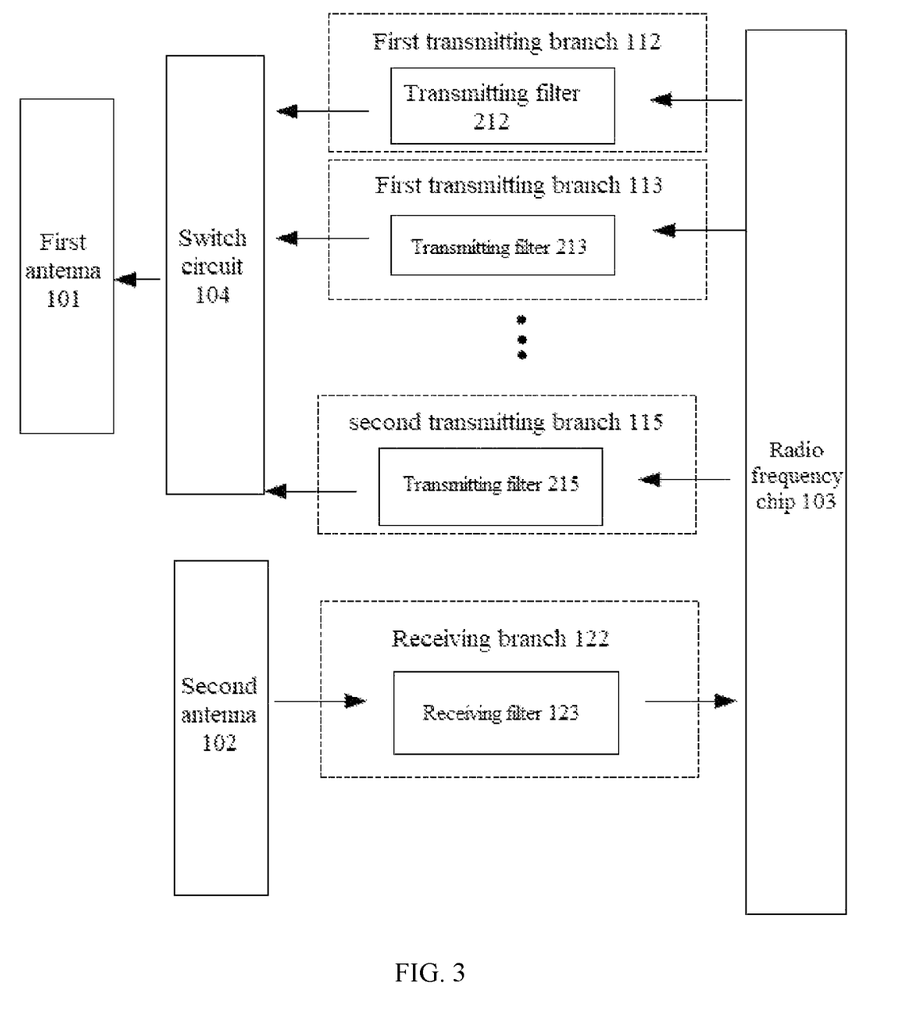
FIG. 3 is a structural schematic diagram of a terminal device provided by yet another embodiment of the present application.

In a possible implementation, as shown in FIG. 3, the first channel further comprises a second transmitting branch 115, wherein one terminal of the second transmitting branch 115 is electrically connected to the other terminal of the switch circuit 104, and the second transmitting branch 115 is used to transmit a single-carrier signal.

The receiving branch 122 is also used to receive the single-carrier signal, wherein the frequency band of the single-carrier signal overlaps with the frequency band of at least one of the carrier signals for CA.

For example, if it is determined that the receiving frequency band in the first frequency band for CA overlaps with the receiving frequency band for non-CA, the receiving branch 122 is used to receive the single-carrier signal. Particularly, the single-carrier signal may be received by the receiving filter in the receiving branch 122 and be transmitted to the radio frequency chip 103 via an output port, capable of receiving carrier signal in the frequency band, of the receiving filter.

In a possible implementation, the second transmitting branch 115 comprises a duplexer, wherein one terminal of the duplexer is electrically connected to the other terminal of the switch circuit, and the other terminal of the duplexer is electrically connected to the radio frequency chip 103; and the second transmitting branch 115 is also used to receive the single-carrier signal.

For example, if it is determined that the receiving frequency bands in all the frequency bands for CA are different from the receiving frequency band of the single-carrier signal, the single-carrier signal is received by the first antenna 101 and is transmitted to the radio frequency chip through the duplexer in the second transmitting branch 115.

In a possible implementation, the terminal device further comprises a controller used to control the switch-on state of the other terminal of the switch circuit with the first transmitting branches 112-113 and the second transmitting branch 115.

As can be seen from the above description, the embodiment of the present application not only can realize CA but also can realize single-carrier data transmission by switching on the first transmitting branch or the second transmitting branch in one frequency band and the receiving branch. Therefore, the terminal device in this embodiment of the present invention is compatible with single-carrier transmission and CA transmission.

Optionally, each first transmitting branch or the second transmitting branch may further comprise a power amplifier (abbreviated as PA) which is arranged between the radio frequency chip 103 and the corresponding transmitting filter.

In a specific implementation process, the transmitting filters and/or duplexers in the first transmitting branches are electrically connected to the radio frequency chip 103 through the power amplifiers; and the duplexer in the second transmitting branch is electrically connected to the radio frequency chip 103 through the power amplifier.

The PAs are used for power amplification of carrier modulated signals modulated by the radio frequency chip 103 to obtain required transmitting power.

Possible compositions of the first transmitting branches, the second transmitting branch, and the receiving branch are illustrated above. In actual application, the first transmitting branches, the second transmitting branch, and the receiving branch may further comprise other elements as long as CA is not affected.

Optionally, to guarantee the reliability of the whole path, the power capacity of the transmitting filters on the first transmitting branches and the second transmitting branch should meet the transmitting power requirements of the first transmitting branches and the second transmitting branch. For example, if the transmitting power required by the first transmitting branches is 50 W, the power capacity of the transmitting filters corresponding to the first transmitting branches should reach 50 W.

The implementation of the terminal device of the embodiment of the present invention will be described below with two specific examples. Referring to FIG. 2, in this embodiment, the first transmitting branches 112-114 comprise transmitting filters 212-214; suppose the two frequency bands for CA are respectively a frequency band B1 and a frequency band B3. Under the condition of single carrier in the frequency band B1, an input port of the switch circuit 104 is switched to be connected with the first transmitting branch 112 corresponding to the frequency band B1, and the receiving branch receives the frequency band B1; and under the condition of single carrier in the frequency band B3, the input port of the switch circuit is switched to be connected with the first transmitting branch 113 corresponding to the frequency band B3, and the receiving branch receives the frequency band B1. Supposing that a base station sends indication information, which indicates that the frequency band B1 is the principal frequency band and the frequency band B1 and the frequency band B3 are used for downlink CA, to the terminal device at a certain moment, the input port of the switch circuit 104 in the first antenna 101 is switched to be connected with the first transmitting branch 112, the carrier signal in the frequency band B1 are transmitted by the first antenna 101, and carrier signals for CA in the frequency band B1 and the frequency band B3 are received by the receiving branch 122 of the second antenna 102. For another example, supposing that the base station sends indication information, which indicates that the frequency band B1 is the principal frequency band and the frequency band B1 and the frequency band B3 are used for uplink CA, to the terminal device at a certain moment, the input port of the switch circuit 104 is switched to be connected with the first transmitting branch 114, the carrier signals for CA in the frequency band B1 and the frequency band B3 are transmitted by the first antenna 101, and the carrier signal in the frequency band B1 are received by the receiving branch 122 of the second antenna 102.

In this embodiment, the first transmitting branches 112-113 comprise duplexers, and the receiving branch 122 comprises a balance transformer. Supposing that the two frequency bands for CA are respectively a frequency band B1 and a frequency band B3, under the condition of single carrier in the frequency band B1, the input port of the switch circuit is switched to be connected with the first transmitting branches 112-113 corresponding to the frequency band B1, and the first antenna 101 and the second antenna 102 synchronously receive carrier signals in the frequency band B1; and under the condition of single carrier in the frequency band B3, the input port of the switch circuit is switched to be connected with the first transmitting branch 113 corresponding to the frequency band B3, and the first antenna 101 and the second antenna 102 synchronously receive carrier signals in the frequency band B3. Supposing that the base station sends indication information, which indicates that the frequency band B1 is the principal frequency band and the frequency band B1 and the frequency band B3 are used for downlink CA, to the terminal device at a certain moment, the input port of the switch circuit 104 is switched to be connected with the first transmitting branch 112, the first antenna 101 and the second antenna 102 synchronously receive carrier signals in the frequency band B1, and the carrier signals in the frequency band B1 received by the first antenna 101 and the second antenna 102 are synthesized by the balance transformer into an enhanced carrier signal in the frequency band B1.

The terminal device provided by the embodiment of the present application comprises a first antenna, a second antenna, a first channel electrically connected to the first antenna, and a second channel electrically connected to the second antenna, wherein the first channel comprises at least two first transmitting branches which are used to transmit carrier signals for CA; and the second channel comprises a receiving branch electrically connected to the second antenna and a receiving filter electrically connected to the receiving branch, wherein the receiving branch is used to receive CA signals, and the receiving filter is used to filter the CA signals to obtain the carrier signals for CA. CA is implemented without quadplexers, and the CA cost is greatly reduced; and the second antenna does not adopt a switch so that an insertion loss caused by the usage of a switch for receiving carrier signals for CA in the prior art is avoided, and the radio frequency receiving performance is effectively improved. The communication quality is improved, the cost is reduced, and the product competitiveness is improved.

In some embodiments of the present application, the terminal device may further comprise a controller, a processor, a memory, and a user input module. It should be appreciated that not all illustrated assemblies need to be implemented. More or less assemblies may be implemented alternatively. In addition, the assemblies may be of a bus structure or other structures such as a star structure, and the present invention has no limitation in this aspect.

The controller controls the switch-on state of multiple input ports with the first transmitting branches, the second transmitting branch, and the receiving branch according to the indication information sent from the base station.

In actual application, the controller can also control the switch-on state of the multiple input ports of the switch circuit 104 with the first transmitting branches, the second transmitting branch, and the receiving branch according to a decision made by the terminal device.

Optionally, the controller may be an independent controller, or may be integrated with the switch circuit, or integrated with the processor.

Optionally, the processor is a general central processing unit, an application-specific integrated circuit (abbreviated as ASIC), one or more integrated circuits for controlling program execution, or a hardware circuit developed based on a field-programmable gate array (abbreviated as FPGA).

Optionally, the processor typically controls the overall operations of the terminal device. For example, the processor performs control and processing relating to voice communication, data communication, video communication, and the like.

Optionally, the memory can store software programs to be executed by the processor to perform processing and control operations or can store output data or to-be-output data (such as telephone directories, messages, static images, videos, and the like). The memory can also store various vibration and sound signal data output when a touch screen is touched.

The memory may include one or more of a read-only memory (abbreviated as ROM), a random access memory (abbreviated as RAM), and disk memory. One or more memories can be configured.

The user input module can generate key input data according to an instruction input by a user to control various operations of the terminal device. The user input module allows the user to input various types of information and may include one or more of a keyboard, a touch panel, a roller, and a joystick. When the touch panel is disposed on a display as a layer, a touch screen can be formed.

An embodiment of the present application provides a method for implementing carrier aggregation utilizing the terminal device. The method comprises:

Step 1: determining at least two frequency bands for CA;

Step 2: in the case of downlink CA, controlling the switch circuit 104 to switch on the first transmitting branch corresponding to one of the at least two frequency bands; or Step 3: in the case of uplink CA, controlling the switch circuit 104 to switch on the first transmitting branches corresponding to the at least two frequency bands.

Optionally, Step 1 may comprise: determining the at least two frequency bands according to received indication information from a network-side device, wherein the indication information is used to indicate the at least two frequency bands. This step can be performed by the controller.

For example, as for the terminal device shown in FIG. 2, supposing that the terminal device operates in a single-carrier mode at present and carriers in the frequency band B1 are used, the base station can send indication information to the terminal device by means of the carriers in the frequency band B1, wherein the indication information indicates that the frequency band B1 and the frequency band B3 are used for downlink CA. The processor or the controller of the terminal device analyzes the indication information to know that downlink CA needs to be carried out by means of the frequency band B1 and the frequency band B3, and in this case, the controller controls the input port of the switch circuit 104 to switch to be connected with the first transmitting branch corresponding to the frequency band B1 or the frequency band B3, and carrier signals in the frequency band B1 and the frequency band B3 are received by the second antenna.

Specifically, the first transmitting branches can receive carrier signals in any one of the frequency band B1 and the frequency band B2. The indication information may also indicate the principal frequency band of the at least two frequency bands in Step 101, and the input port of the switch circuit 104 is switched to be connected with the first transmitting branch corresponding to the principal frequency band. In this embodiment, if the indication information indicates that the frequency band B1 is the principal frequency band, the input port of the switch circuit 104 is switched to be connected with the first transmitting branch corresponding to the frequency band B1.

If the indication information indicates that the frequency band B1 and the frequency band B3 are used for uplink CA, the controller controls the input port of the switch circuit to switch to be connected with the first transmitting branch 114 corresponding to the frequency band B1 and the frequency band B3 which are combined. As for the example shown in FIG. 2, a two-in-one transmitting filter corresponding to the frequency band B1 and the frequency band B3 is adopted, so that both the frequency band B1 and the frequency band B3 correspond to the transmitting branches. Eventually, the first transmitting branch corresponding to the frequency band B1 and the frequency band B2 which are combined, as well as the receiving branch are switched on simultaneously.

In actual application, Step 1 may also be implemented in another way. Specifically, Step 1 comprises: determining the at least two frequency bands as actually needed. For example, supposing that the size of data to be currently transmitted by the terminal device is large, it is determined that uplink CA should be carried out; and then, the frequency bands for uplink CA are determined according to a required transmission bandwidth. The other steps are similar to those of the case where the indication information is sent by the network-side device and will not be detailed anymore.

The base station or the network-side device in the present application may be a base transceiver station (abbreviated as BTS) in a global system of mobile communication (abbreviated as GSM) or code division multiple access (CDMA), a NodeB (abbreviated as NB) in wideband code division multiple access (abbreviated as WCDMA), an evolutional Node B (abbreviated as eNB or eNodeB) in long term evolution (abbreviated as LTE), a relay station, an access point, a base station in a future 5G network, or the like. The present application has no limitations in this aspect.

In this article, the term "and/or" is merely used to describe the relationship between associated objects and indicates three possible relationships. For example, A and/or B indicates that only A exits, or both A and B exit, or only B exists. In addition, the character "/" typically indicates an "or" relation between associated objects.

Those skilled in the art would appreciate that the embodiments of the present invention may provide a method, a system, or a computer program product. Thus, the present invention can be implemented entirely by hardware, or entirely by software, by both software and hardware. In addition, the present invention may be in the form of a computer program product which can be implemented in a computer-available storage medium (including, but not limited to, a disk memory, a CD-ROM, an optical memory, and the like) storing one or more computer-available program codes.

The present invention is described regarding flow diagrams and/or block diagrams of the method, device (system) and computer program project provided by the embodiments of the present invention. It should be noted that each process and/or box in the flow diagrams and/or block diagrams, and the combination of the processes and/or boxes in the flow diagrams and/or block diagrams can be implemented by means of computer program instructions. These computer program instructions can be input to a universal computer, a special-purpose computer, an embedded processor or the process of other programmable data processing equipment to generate a machine so that a device with functions specified in one or more boxes of one or more flow diagrams and/or block diagrams can be generated by the instructions executed by the computer or the processor of other programmable data processing equipment.

These computer program instructions can also be stored in a computer-readable memory which can guide the computer or other programmable data processing equipment to operate in a specific manner so that an instruction device can be generated by the instructions stored in the computer-readable memory, and the instruction device can fulfill the functions specified in one or more boxes of one or more flow diagrams and/or block diagrams.

These computer program instructions can also be loaded on a computer or other programmable data processing equipment, so that a series of operation steps can be performed on the computer or other programmable data processing equipment to implement computer-based processing so that the instructions can be executed on the computer or other programmable equipment to perform the steps for fulfilling the functions specified in one or more boxes of one or more flow diagrams and/or block diagrams. Although the preferred embodiments of the present invention have been described, those skilled in the art can make other transformations and modifications to these embodiments based on the basic creative concept of the present invention. Therefore, the appended claims are intended to include the preferred embodiments as well as all transformations and modifications falling within the scope of the present invention.

Obviously, those skilled in art can make various transformations and modifications to the present application without departing from the spirit and scope of the present application. The present application is intended to include all these transformations and modifications as long as these transformations and modifications are within the scope defined by the claims and their equivalents.

What is claimed:

1. A terminal device, comprising:
   a first antenna, a second antenna, a first channel electrically connected to the first antenna, and a second channel electrically connected to the second antenna, wherein:
   the first channel comprises at least two first transmitting branches which are used to transmit carrier signals for carrier aggregation (CA) through the first antenna; and
   the second channel comprises a receiving branch electrically connected to the second antenna and a receiving filter electrically connected to the receiving branch, wherein the receiving branch is used to receive CA signals through the second antenna, and the receiving filter is used to filter the CA signals to obtain the carrier signals for CA,
   wherein the first channel comprises a switch circuit, one terminal of the switch circuit is electrically connected to the first antenna, and the other terminal of the switch circuit is electrically connected to the first transmitting branches, and
   wherein at least one of the first transmitting branches comprises a duplexer, wherein one terminal of the duplexer is electrically connected to said other terminal of the switch circuit, and the other terminal of the duplexer is electrically connected to a radio frequency chip, and
   wherein the terminal device further comprises a Balun, a first input terminal of the Balun is electrically connected to the duplexer in the at least one of the first transmitting branches, a second input terminal of the Balun is electrically connected to the receiving filter in the second channel, and an output terminal of the Balun is electrically connected to the radio frequency chip; and
   the Balun is used to combine the same carrier signals for CA received by the at least one of the first transmitting branches and the second channel into an enhanced carrier signal.

2. The terminal device according to claim 1, wherein
the at least two first transmitting branches comprise transmitting filters, one terminal of each of the transmitting filter is electrically connected to said other terminal of the switch circuit, and the other terminal of each said transmitting filter is electrically connected to the radio frequency chip.

3. The terminal device according to claim 2, wherein the first channel further comprises a second transmitting branch, and the second transmitting branch is electrically connected to the other terminal of the switch circuit and is used to transmit a single-carrier signal.

4. The terminal device according to claim 3, wherein the receiving branch is also used to receive the single-carrier signal, and a frequency band of the single-carrier signal overlaps with a frequency band of at least one of said carrier signals for CA.

5. The terminal device according to claim 4, wherein the terminal device further comprises:
a controller used to control a switch-on state of said other terminal of the switch circuit with the first transmitting branches and the second transmitting branch.

6. The terminal device according to claim 4, wherein the transmitting filters and/or duplexers in the first transmitting branches are electrically connected to the radio frequency chip through first power amplifiers; and
a duplexer in the second transmitting branch is electrically connected to the radio frequency chip through a second power amplifier.

7. The terminal device according to claim 3, wherein the first transmitting branches are also used to transmit a single-carrier signal, and a frequency band of the single-carrier signal overlaps with a frequency band of at least one of said carrier signals for CA.

8. The terminal device according to claim 7, wherein the terminal device further comprises:
a controller used to control a switch-on state of said other terminal of the switch circuit with the first transmitting branches and the second transmitting branch.

9. The terminal device according to claim 7, wherein the transmitting filters and/or the duplexer in the first transmitting branches are electrically connected to the radio frequency chip through first power amplifiers; and
a duplexer in the second transmitting branch is electrically connected to the radio frequency chip through a second power amplifier.

10. The terminal device according to claim 3, wherein the second transmitting branch comprises a duplexer; and
one terminal of the duplexer of the second transmitting branch is electrically connected to said other terminal of the switch circuit, and the other terminal of the duplexer of the second transmitting branch is electrically connected to the radio frequency chip, and the second transmitting branch is also used to receive the single-carrier signal.

11. The terminal device according to claim 10, wherein the terminal device further comprises:
a controller used to control a switch-on state of said other terminal of the switch circuit with the first transmitting branches and the second transmitting branch.

12. The terminal device according to claim 10, wherein the transmitting filters and/or the duplexer in the first transmitting branches are electrically connected to the radio frequency chip through first power amplifiers; and
the duplexer in the second transmitting branch is electrically connected to the radio frequency chip through a second power amplifier.

13. The terminal device according to claim 2, wherein the transmitting filters and/or the duplexer in the first transmitting branches are electrically connected to the radio frequency chip through first power amplifiers; and
a duplexer in a second transmitting branch is electrically connected to the radio frequency chip through a second power amplifier.

14. The terminal device according to claim 1, wherein the terminal device further comprises:
a controller used to control a switch-on state of said other terminal of the switch circuit with the first transmitting branches and a second transmitting branch.

15. The terminal device according to claim 1, wherein the first channel further comprises a second transmitting branch, and the second transmitting branch is electrically connected to the other terminal of the switch circuit and is used to transmit a single-carrier signal.

\* \* \* \* \*